United States Patent [19]
Garg et al.

[11] Patent Number: 6,144,945
[45] Date of Patent: Nov. 7, 2000

[54] METHOD FOR FAST AND ACCURATE EVALUATION OF PERIODIC REVIEW INVENTORY POLICY

[75] Inventors: Amit Garg, White Plains; Jayant Ramarao Kalagnanam, Tarrytown, both of N.Y.

[73] Assignee: International Business Machines Corporation, Armonk, N.Y.

[21] Appl. No.: 08/892,620

[22] Filed: Jul. 14, 1997

[51] Int. Cl.[7] .................................................. G06F 17/60
[52] U.S. Cl. .................................................. 705/28; 705/8
[58] Field of Search .............. 705/28, 7, 8; 364/468.05; 700/99

[56] References Cited

U.S. PATENT DOCUMENTS

| | | | |
|---|---|---|---|
| 5,168,445 | 12/1992 | Kawashima et al. | 705/28 |
| 5,216,594 | 6/1993 | White et al. | 705/28 |
| 5,237,496 | 8/1993 | Kagami et al. | 705/28 |
| 5,305,199 | 4/1994 | LoBiomdo et al. | 705/28 |
| 5,581,461 | 12/1996 | Coll et al. | 705/28 |
| 5,608,621 | 3/1997 | Caveney et al. | 705/28 |

OTHER PUBLICATIONS

Hau L. Lee, "Single and Multiple Location Stochastic Inventory Models", Lecture Notes, Department of Industrial Engineering Management, Stanford University.

H. Carlsson, "Remainder Term Estimates of Renewal Function", The Annals of Probability, Nov. 1, 1983, pp. 143–157.

R. Cleroux & D.J. McConalogue, "A Numerical Algorithm for Recursively–Defined Convolution Integrals Involving Distribution Functions", Management Science, 22, 1976, pp. 1138–1146.

D.J. McGonalogue, "Numerical Treatmetn of Convolution Integrals Involving Distributions with Densities Having Singularities at the Origin", Communications in Statistics, Series B 10, 1981, pp. 265–280.

L.A. Baxter et al., "Renewal Tables: Tables of Functions Arising in Renewal Theory", Technical Report, Graduate School of Business Admin., University of Southern California, 1981.

L.A. Baxter et al., "On the Tabulation of the Revewal Function", Technometrics, 24, 1982, pp. 151–156.

W–B Gong et al., "Pade Approximation for Stochastic Discrete–Event Systems", IEEE Transactions on Automatic Control, 40, 8, 1995, pp. 1349–1358.

*Primary Examiner*—Allen R. MacDonald
*Assistant Examiner*—Forest O Thompson, Jr.
*Attorney, Agent, or Firm*—Whitham, Curtis & Whitham; Stephen C. Kaufman, Esq.

[57] ABSTRACT

A computer implemented process is provided for fast and accurate evaluation of the performance characteristics of the periodic-review (s,S) inventory policy with complete back ordering. This policy has an underlying stochastic process that is a renewal process. The method provides a novel computer implementation of a fast and accurate way to compute approximations of the renewal function. In order to overcome the computational problems in evaluating renewal functions numerically, an approximation scheme has been devised whereby the renewal function of the truncated normal distribution can be characterized by two parameters: (1) its coefficient of variation, and (2) the point at which the function needs to be evaluated. This approximation is derived in two stages. In the first stage, a class of rational polynomial approximations are developed to the renewal function, called Padé approximants. In the second stage, polynomial expressions are derived for each coefficient of the Padé approximants in terms of the coefficient of variation of the distribution.

3 Claims, 4 Drawing Sheets

METHOD FOR FAST AND ACCURATE EVALUATION OF PERIODIC REVIEW INVENTORY POLICY

BACKGROUND OF THE INVENTION

1. Field of the Invention

The present invention generally relates to computer software for business management and, more particularly, to a computer implemented method for fast and accurate evaluation of periodic review inventory policy for large scale inventory systems. The invention implements a novel computation of the renewal function using rational polynomial approximants.

2. Background Description

With the drive to increase profitability, manufacturers and retailers are increasingly focusing on minimizing their inventory costs. As a result, manufacturers and retailers have invested in computer-based inventory management systems. Such inventory management systems aim to pare inventories to the minimum level necessary for satisfying customer service requirements. In order to attain this objective, we are interested in being able to monitor the performance of the inventory system and to optimize the policy parameters.

The (s,S) policy and its variants are among the most commonly used inventory policies. Under this type of inventory policy, one places an order with the supplier once the inventory position (or the level) falls below the re-order point, s. The size of the order placed is such that the inventory level is raised to the order-up-to limit, S. We shall focus on the periodic-review (s,S) policy with complete back ordering. The continuous review version of this policy can be derived as a special case of the policy studied here.

For (s,S) inventory systems there are two questions to one who would be interested in the performance of the systems according to various metrics, and the optimal values of parameters s and S. The two questions are interlinked because the performance measures of an (s,S) inventory system are functions of s and S. On the other hand, the performance measures are also used to optimize the values of the policy parameters.

Some of the metrics used to evaluate the performance of an inventory system are:

Average stock on-hand and its variance.

Average back order level and its variance.

Service-level provided by the system.

Average cost per period of ordering and holding inventory.

(s,S) inventory systems, like applications in the areas of queuing and reliability, have underlying stochastic processes that exhibit regenerative behavior. Regenerative stochastic processes are appealing for analysis purposes because one can apply renewal theory to model such systems. The use of renewal theory facilitates derivation of analytical expressions and/or the design simulation experiments to further characterize the regenerative stochastic process. In the (s,S) inventory system, the inventory position process is regenerative, and therefore, one can derive analytical expressions and/or design simulation experiments to study the characteristics of this process. However, more germane to the discussion here is the fact that the inventory position process is related to many other stochastic processes such as the on-hand inventory process, back order level process, average cost process, etc., in the inventory system. As a result, one can also model these related stochastic processes using renewal theory. Therefore, renewal theory lies at the heart of performance modeling of (s,S)-type inventory systems.

In the past, researchers have derived the exact analytical expressions for the performance measures for the steady-state analysis of (s,S)-type systems. These expressions are in terms of the renewal function and have not been used in most systems because of the difficulties in evaluating these expressions numerically. This is largely due to the fact that the renewal function cannot be expressed in closed-form for most common probability distributions. Hence one needs to expend a considerable amount of computation time in order to evaluate the renewal function and its derivative. Therefore, the current practice is to use approximate analytical expressions or simulation to evaluate the performance of (s,S)-type inventory systems.

SUMMARY OF THE INVENTION

It is therefore an object of the invention to provide a computer implemented process to derive the limiting distributions, and hence the moments for performance measures such as on-hand inventory and back-order levels, the average fill-rate, and also determine the optimal parameter levels s and S.

It is another object of the invention to provide a novel computer implementation of a fast and accurate way to compute approximations of the renewal function.

According to the invention, a method is provided for fast and accurate evaluation of the performance characteristics of the periodic-review (s,S) inventory policy with complete back ordering. This policy has an underlying stochastic process that is a renewal process. As a result, all the performance characteristics can be expressed in terms of the renewal function.

In order to overcome the computational problems in evaluating renewal functions numerically, an approximation scheme has been devised whereby the renewal function of the truncated normal distribution can be characterized by two parameters: (1) its coefficient of variation, and (2) the point at which the function needs to be evaluated. This approximation is derived in two stages. In the first stage, a class of rational polynomial approximations are developed to the renewal function, called Padé approximants. In the second stage, polynomial expressions are derived for each coefficient of the Padé approximants in terms of the coefficient of variation of the distribution.

This methodology is very useful while analyzing systems with millions of stock keeping unit (SKU)-location combinations. It has obviated even the computation required to develop the Padé approximation each time we need to evaluate the renewal function and its derivative. Overall, our approximations are within 1% of the optimal for most coefficients of variations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
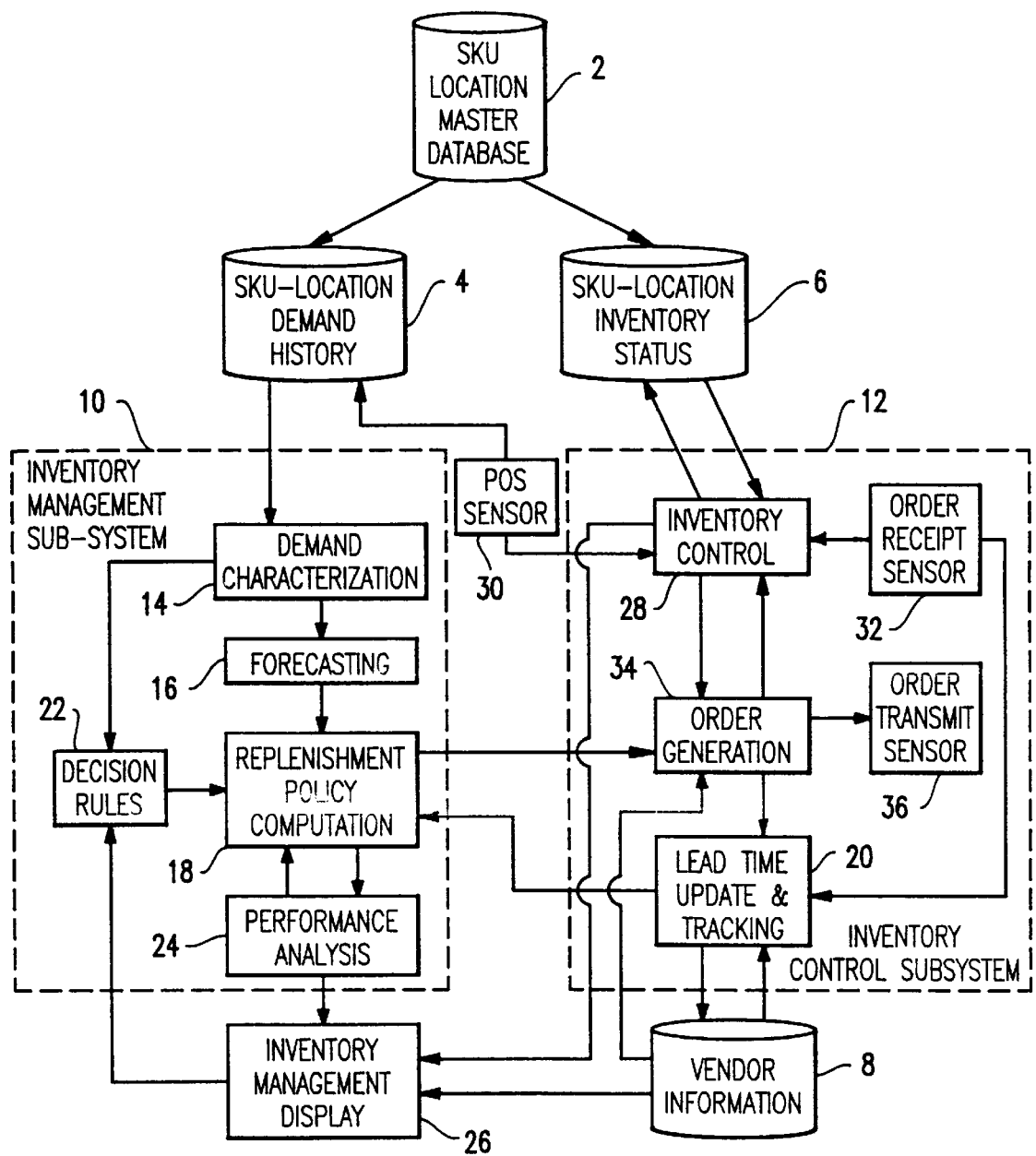
FIG. 1 is a block diagram of a computer system on which the method according to the invention may be implemented.

Referring now to the drawings, and with particular reference to FIG. 1, there is shown a block diagram of a computer system on which the method according to the invention may be implemented. The FIG. 1 depicted block diagram for carrying out the invention described herein can be implemented, in a preferred embodiment, as a multi-tier client-server architecture. The server (not shown as a unit) of this architecture is a centralized repository of all data, maintains the data and performs computationally-intensive operations. The server can be realized by any large-scale computer system such as, for example, an IBM System 390, IBM AS400, or IBM RS6000. The client area of the of the multi-tier architecture may consist of a network of personal computers (PCS) and network computers (NCs) (not shown as specific units), functions to display information and as a means for transmitting messages to the server for performing specific tasks described below.

Referring again to FIG. 1, the databases in the system all reside on the server (not shown), and include the SKU-Location Master database 2, the SKU-Location Demand History database 4, the SKU-Location Inventory Status database 6, and the Vendor Information database 8. Each of these databases is preferably stored on a very large direct access storage device (DASD), from which data can be extracted and updated using an SQL-based database program such as, for example, the widely available IBM DB2.

The SKU-Location Master database 2 stores a master list of SKUs that are available, or feasible, at a location. For a large retailer, a "location" could be a store or a distribution center. This master list of feasible SKU-Locations (and combinations thereof) is used to manage the SKU-Location Demand History database 4 and the SKU-Location Inventory Status database 6. The SKU-Location Demand History database 4 stores historical sales information for all SKU-Location combinations, while the SKU-Location Inventory Status database 6 maintains a current inventory status on all SKU-Location combinations. The inventory status information about a particular location includes, for example, information such as the number of items on-hand, the number of items on order, information describing the status of each outstanding order, and the current backorder level.

As shown in FIG. 1, the functional blocks of the system are grouped into two main parts: the Inventory Management Sub-System 10 and the Inventory Control System.

The Demand Characterization processing, shown as block 14 of the Inventory Management Subsystem 10, takes input from the SKU-Location Demand History database 4. The Demand Characterization processing 14 identifies particular significant factors affecting historical sales of an SKU at a particular location, and quantifies their effect on sales. The significant factors identified, with the effects quantified, include, for example, demand mean and variance, statistical outliers, missing values, trend, seasonality, promotions, competitors' actions weather and demographics. This list of factors is not all inclusive, as others affecting sales are well known in the related art. The output of the Demand Characterization processing block 14 is a de-seasonalized time series of historical sales for each SKU-Location combination.

The de-seasonalized time series of historical sales is used to construct a de-seasonalized sales forecast in the Forecasting processing block 16. The processing block 16 can utilize IBM's program product INFOREM, which contains algorithms to forecast de-seasonalized sales. The Forecasting block 16 then constructs the sales forecast by adding the effects of the significant factors identified in the Demand Characterization block 14 to the de-seasonalized sales forecast. The result is input to the Replenishment Policy Computation block 18.

The Replenishment Policy Computation block 18 computes the parameters of the inventory replenishment policy. Inputs to this function block 18 include the mean and variance of the demands, the lead time required to procure the items from the Lead Time Update and Tracking Process 20, and Decision Rules 22, for replenishment of the SKU at a given location.

Determination of parameters of the commonly used (s,S)-type replenishment policies requires repeated evaluation of this renewal function. The present method permits very fast and accurate evaluation of the renewal function. To compute the optimal values of the policy parameters entails solving nonlinear programming problems in which the objective is to minimize inventory holding and shortage costs. The present invention's method for this solution is shown by, and described below in reference to, FIGS. 2–4.

Referring to FIG. 1, the Performance Analysis process block 24 evaluates various measures of performance of the inventory system, such as the average on-hand inventory, the average backorder level, the average number of orders per period, and the order fill rate. These measures are used in the nonlinear programming problem described below to determine the parameters of the inventory policy.

The results of the Performance Analysis 24 and Replenishment Policy Computation process 18 are displayed on the Inventory Management Display System 26. The Inventory Management Display System 26 is a set of graphical user interfaces (GUIs) residing on the client system (not shown) and developed using available products such as, for example, the IBM Visual Age C++. Users employ this system to relay messages to the server (not shown) to view and update information in the databases, analyze forecasts and inventories, and modify replenishment decision rules.

Data for the Inventory Control Subsystem 12 resides in the SKU-Location Inventory Status database 6. The database 6 is updated through the Inventory Control process 28. The Inventory Control process 28 receives latest sales information from the Point of Sales (POS) Sensors 30 located in the cash registers (not shown) of each store, and in the form of Advance Shipping Notices from the distribution centers. POS Sensors 30 track the outflow of items from a location. The POS Sensors 30 feed item outflows real-time into the Inventory Control process 28, which updates the SKU-Location Inventory database 6. The POS Sensors 30 also update the SKU-Location Demand History database 4 on a periodic basis to update the periodic sales history for an SKU location.

Inventory Control process 28 receives information concerning item inflows at a site from the Order Receipt Sensors 32. Examples of data and information received as, or through, Order Receipt Sensors 32 include EDI information, Advance Shipping Notices from vendors and distribution centers, and bar-code scanner data from the receiving dock (not shown) of each site.

Order Generation process 34 generates orders and transmits them to the vendors. The Order Generation process 34 uses input reflecting the latest inventory status from the Inventory Control process 28, and replenishment policy parameters from the Replenishment Policy Computation process 18 to determine if an order needs to be generated. The determination itself is based on the inventory status (including inventory on hand and on order) and the s value (the reorder point). If an order is to be generated, the process Order Generation process 34 obtains information concerning the vendor from the Vendor Information database 8 and generates an order through the Order Transmit Sensor 36. The Order Transmit 36 may be via EDI transmissions, transmissions through the Internet, by fax or by paperwork. The Order Generation process 34 also sends order information to the Lead Time Update and Tracking process 20, which tracks and updates a vendor's delivery performance.

Analysis of (s,S) Inventory Systems

Consider an (s,S)-type inventory system operating under a periodic review policy having a lead time of l review periods. The demand in period n, $D_n$, is assumed to have a truncated normal distribution with a cumulative distribution function (cdf) given by F (.) and a probability density function (pdf) of f (.).

The sequence of events in a period is as follows:

At the beginning of the period, the outstanding order that was due to arrive is received.

At the beginning of the period, the inventory position is reviewed and an ordering decision is made.

Customer demands are observed.

At the end of the period inventory holding and shortage costs are assessed.

Let $X_n$ denote the inventory position at the beginning of period n before an ordering decision is made. Note that $-\infty < X_n < S$, and $X_n$ is restored to S as soon as an order is placed. Observe that the stochastic process, $\{X_n, n>0\}$, is a renewal process. As mentioned above, the objective is to derive the limiting distributions, and hence the moments for performance measures such as on-hand inventory and back-order levels, the average fill-rate, and also determine the optimal parameter levels s and S.

The limiting distribution of the inventory position is first derived and then used to derive expressions for the performance measures of interest. Let $\Pi_n(k)$ denote $P(X_n=k)$. Following the development reported by Hau L. Lee in "Single and Multiple Location Stochastic Inventory Models", *Lecture Notes,* Department of Industrial Engineering Management, Stanford University, the one-step transition probabilities for the inventory position process can be represented as:

$$\pi_{n+1}(k) = \begin{cases} f(S-k)\sum_{j=-\infty}^{s-1}\pi_n(j) + \sum_{j=s}^{S}f(j-k)\pi_n(j), & k < s; \\ f(S-k)\sum_{j=-\infty}^{s-1}\pi_n(j) + \sum_{j=k}^{S}f(j-k)\pi_n(j), & s \le k \le S. \end{cases} \quad (1)$$

On simplifying and letting $\Pi(k)$ denote $\lim_{n\to\infty}\Pi_n(k)$, the limiting stationary probability distribution of the inventory position can be expressed as:

$$\pi(x) = \begin{cases} \left[ f(S-x) + \sum_{j=s}^{S} f(j-x)m(S-j)\right]\tilde{M}(S-s) & x < s; \\ m(S-x)\tilde{M}(S-s) & s \le x \le S, \end{cases} \quad (2)$$

where m(x) is the density of the renewal function, M(x), and $$\tilde{M}(x) = \frac{1}{(1+M(x))}.$$

Let $I_n$ and $B_n$ denote the on-hand inventory and the back order levels respectively at the end of period n after all the demands in that period have been observed. The distribution of on-hand inventory and back order level in the nth period can be derived by conditioning on the inventory position l+1 review periods ago.

$$P(I_n = k) = \sum_{x=-\infty}^{S} P(I_n = k \mid X_{n-l-1} = x)P(X_{n-l-1} = x), S \ge k \ge 0. \quad (3)$$

Define $D_{lr}$ to be the demand over lead time plus one review period. Therefore, the cdf of $D_{lr}$ is given by $F_{l+1}(.)$. We can now focus on the conditional probabilities in equation (3).

$$P(I_n = k \mid S_{n-l-1} = x) = \begin{cases} P(D_{lr} = S - k) & x < s, k > 0; \\ P(D_{lr} = x - k) & S \ge x \ge s, k > 0; \\ P(D_{lr} \ge S) & x < s, k = 0; \\ P(D_{lr} \ge x) & S \ge x \ge s, k = 0. \end{cases} \quad (4)$$

Letting $\lim_{n\to\infty} P(I_n=k) \equiv P(I=k)$, and using equations (2), (3), and (4), and simplifying we get $$(i = K) = \begin{cases} f_{l+1}(S-k)\tilde{M}(S-s) + \sum_{x=\max(s,k)}^{S} f_{l+1}(x-k)\pi(x), & k > 0; \\ \overline{F}(S-1)\tilde{M}(S-s) + \sum_{x=\max(s,k)}^{S} \overline{F}(x-1)\pi(x), & k = 0, \end{cases} \quad (5)$$

where $\overline{F}(x)=1-F(x)$. The average on-hand inventory and its variance can be computed from $$EI = \sum_{j=0}^{S} jP(I = j), \quad (6)$$

and $\text{VarI}=EI^2-(EI)^2$, where $$EI^2 = \sum_{j=0}^{S} j^2 P(I = j). \quad (7)$$

Similarly, for the back orders we have $$P(B_n = k) = \sum_{x=-\infty}^{S} P(B_n = k \mid X_{n-l-1} = x). \quad (8)$$

The conditional probabilities in the above equation can be expressed as $$P(B_n = k \mid Xn - l - 1 = x) = \begin{cases} P(D_{lr} = S + k) & x < s, k > 0; \\ P(D_{lr} = x + k) & S \ge x \ge s, k > 0; \\ P(D_{lr} \le S) & x < s, k = 0; \\ P(D_{lr} \le x) & S \ge x \ge s, k = 0. \end{cases} \quad (9)$$

Letting $\lim_{n\to\infty} P(B_n=k) \equiv P(B=k)$, and using equations (2), (8) and (9), and simplifying we get $$P(B=k) = \begin{cases} f_{l+1}(S+k)\tilde{M}(S-s) + \sum_{x=s} Sf_{l+1}(x+k)\pi(x), & k > 0; \\ F(S)\tilde{M}(S-s) + \sum_{x=s}^{S} F(x)\pi(x), & k = 0. \end{cases} \quad (10)$$

The average back order level and its variance can be expressed as $$EB = \sum_{j=0}^{\infty} jP(B=j), \quad (11)$$

and $VarB = EB^2 - (EB)^2$, where $$EB^2 = \sum_{j=0}^{\infty} j^2 P(B=j). \quad (12)$$

The service level is expressed as the probability of stocking out. It is equivalent to $P(I=0)$ and can be obtained from equation (5). Therefore, without any loss of generality, assuming that $s>0$, the expression for the service level can be written as $$P(I=0) = \overline{F}(S-1)\tilde{M}(S-s) + \sum_{x=s}^{S} \overline{F}(x-1)\pi(x). \quad (13)$$

In order to derive the average cost per period, note that an order would be placed if the inventory position at the beginning of the period is below s. A heuristic explanation for the derivation of the average cost period is as follows. Note that the expected number of periods before an order needs to be placed given that the current inventory position is at S is M(S−s). Therefore, the expected length of the renewal cycle is 1+M(S−s). The expected ordering cost per period can be K/(1+M(S−s)), where K is the fixed cost of placing an order and 1/(1+M(S−s)) represents the average probability of placing an order at the beginning of a period. Therefore, the average cost period, A, is $$A = \frac{K}{1 + M(S-s)} + hEI, \quad (14)$$

where h is the unit holding cost per period.

The average cost per period and the service requirements reflected in the stock out probability can be used to formulate the nonlinear optimization problem to determine the optimal values of s and S. The nonlinear program can be expressed as $$minA(S, s) \quad (15)$$

$$st$$

$$P(I=0) \geq 1 - \alpha$$

As we can see the expressions for performance analysis of the (s–S) inventory system and those for optimizing the values of the policy parameters are functions of the renewal function and its density. In the next section we outline a method for evaluating the renewal function and its density fast and accurately.

Figure 2:
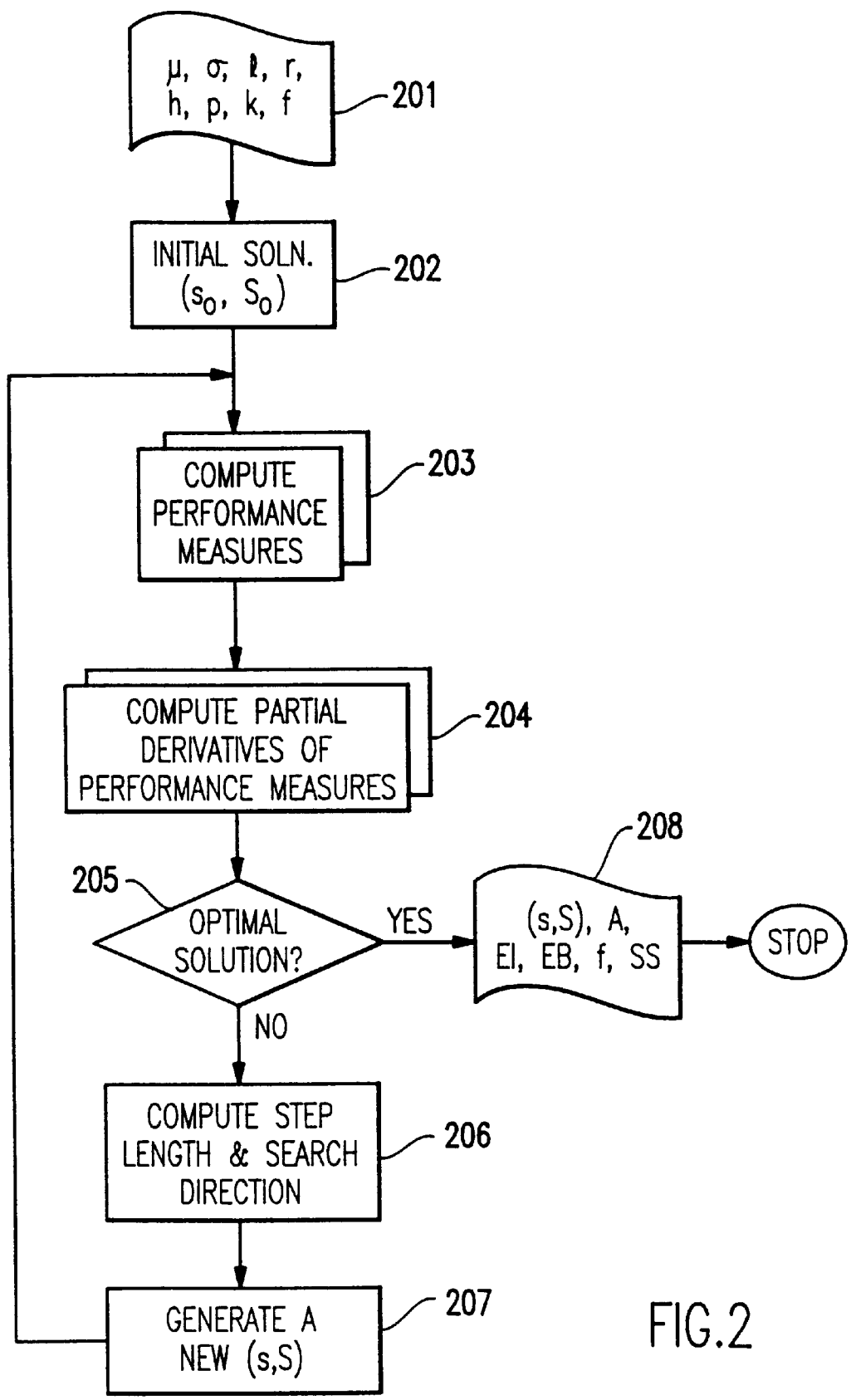
FIG. 2 is a flow diagram showing the overall method according to the invention.

FIG. 2 shows in flow diagram form the overall process as implemented on the computer of FIG. 1. The inputs at 201 are as follows:

$\mu$=mean demand/period
$\sigma$=standard deviation of demand/period
l=lead time
r=review period length
h=holding cost/unit/period
p=shortage penalty/unit/period
K=ordering unit
f=fill rate
A=average cost/period
EI=expected on-hand inventory
EB=expected back order level
SS=safety stock level An initial solution is computed in function block 202 and, using this initial solution, a processing loop is entered in which the optimal solution is computed. The loop begins with computation block 203 where performance measures are computed. Then in computation block 204, the partial derivatives of the computed performance measures are computed. A test is made in decision block 205 to determine if an optimal solution has been computed based on the partial derivatives. If not, the step length and search direction is computed in function block 206, a new (s,S) solution is generated in function block 207, and then the process loops back to computation block 203. When an optimal solution is achieved, then the solution including average cost per period, expected on-hand inventory, expected back order level, and safety stock level is output at 208.

Figure 3:
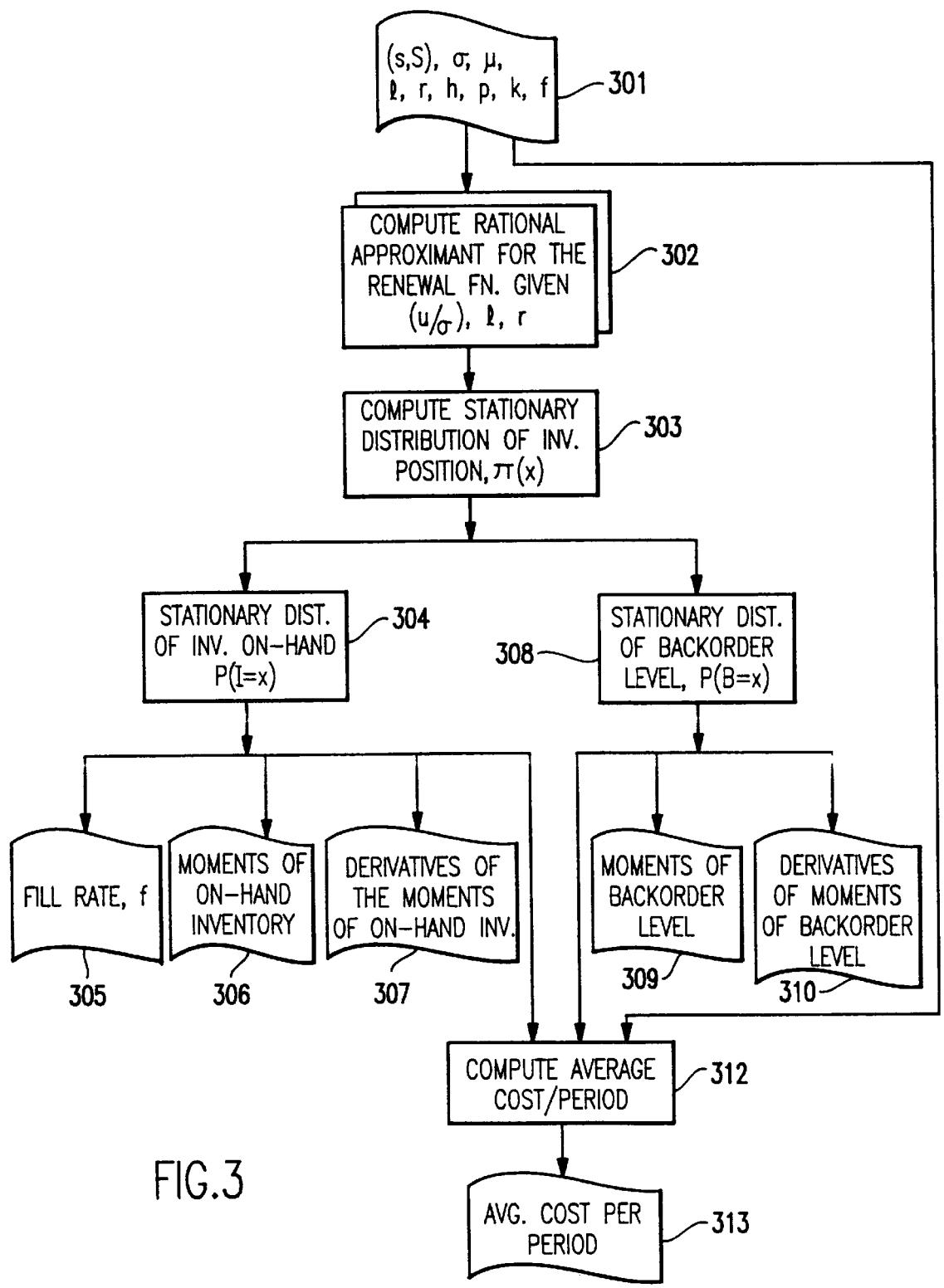
FIG. 3 is a flow diagram showing the logic of the computation of performance measures and their derivatives.

The processes for the computation of the performance measures, computation block 203, and their partial derivatives, computation block 204, in FIG. 2 are shown in more detail in FIG. 3. The initial solution from block 202, together with the inputs from input block 201, are input at 301 to computational block 302. In this block, the rational approximation for the renewal function is computed given $\mu/\sigma$, l and r. Next, the stationary distribution of the inventory position, $\Pi(x)$, is computed in computation block 303. The process then splits. In a first path, the stationary distribution of the inventory on hand, $P(i=x)$, is accessed in function block 304. From this data are output fill rate, f, at block 305, moments of on hand inventory, at block 306, and derivatives of moments of on hand inventory, at block 307. In a second path, the stationary distribution of the back order level, $P(B=x)$, is accessed in function block 308. From this data are output moments of back order level, at block 309, and derivatives of moments of back order level, at block 310. The outputs of blocks 304 and 308 are also input to computation block 312 along with inputs from block 301 where the average cost per period is computed. The computed cost per period is output at block 313.

Figure 4:
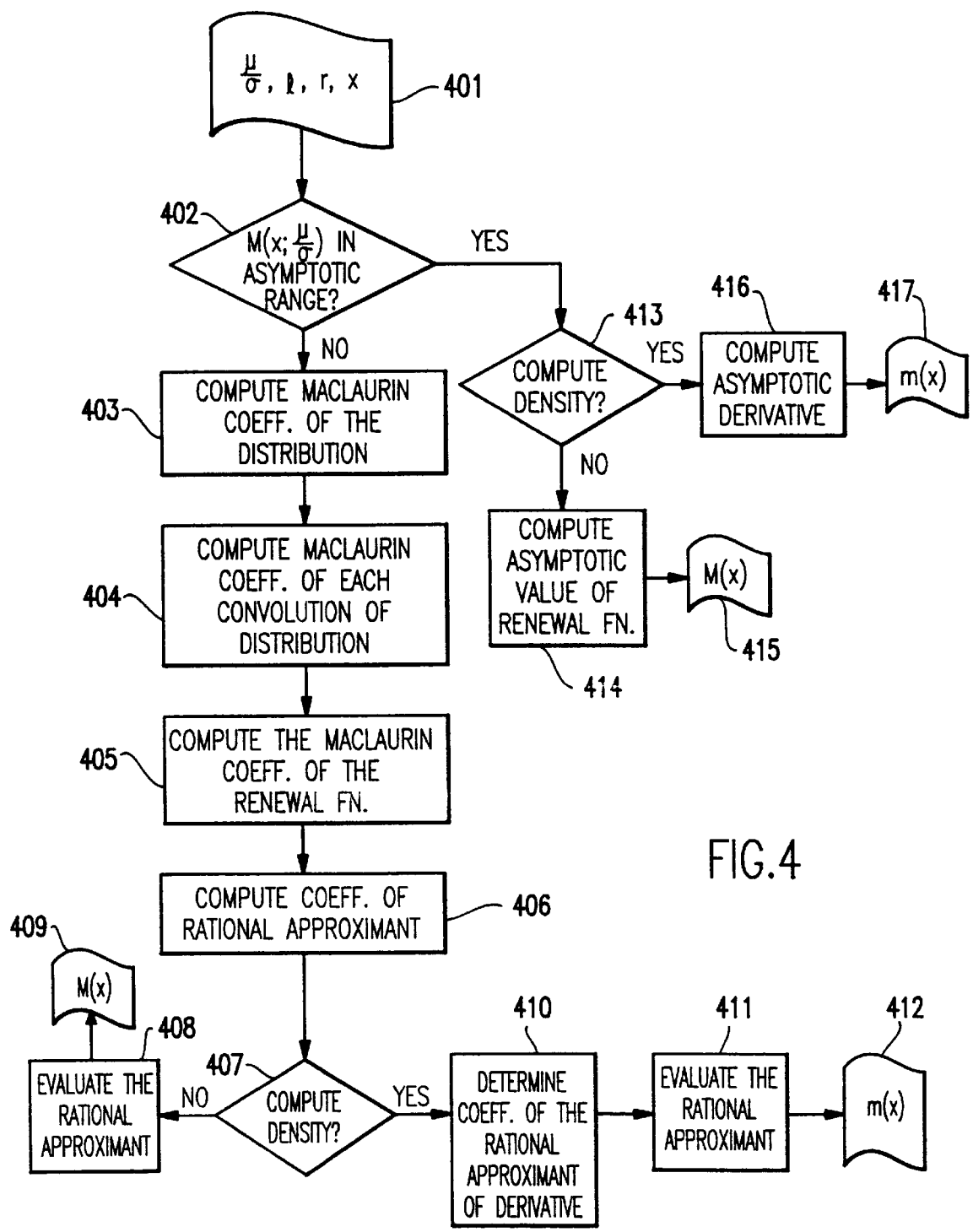
FIG. 4 is a flow diagram showing the logic of the computation of the rational approximation of the renewal function and its density.

The process for computing the rational approximation for the renewal function in block 302 is shown in more detail in FIG. 4. Given the inputs $\mu/\sigma$, l, r and x, where x is the point at which the renewal function and/or its density need to be evaluated, at block 401, a test is first made in decision block 402 to determine if the renewal function, M(x) is in the asymptotic range. If not, the Maclaurin coefficients of the distribution are computed in function block 403. Next, the Maclaurin coefficients of each convolution of distribution are computed in function block 404. The Maclaurin coefficients of the renewal function are then computed in function block 405. Finally, the coefficients of the rational approximation are computed in function block 406. A determination is then made in decision block 407 to determine whether the renewal density is to be computed. If not, the rational approximation is evaluated in function block 408, and the renewal function, M(x), is output at block 409. If the density is to be computed, the coefficients of the rational approximation of the derivative are determined in function block 410. The rational approximation is evaluated in function block 411, and the density of the renewal function, m(x), is output at block 412.

Returning to decision block 402, if the renewal function is in the asymptotic range, a further test is made in decision block 413 to determine if the density is to be computed. If not, the asymptotic value of the renewal function is computed in function block 414, and the renewal function, M(x), is output at block 415. If the density is to be computed, then the asymptotic derivative is computed in function block 416, and the density of the renewal function, m(x), is output at block 417.

Computation of the Renewal Function

Renewal function is defined as the infinite sum of the convolutions of the interval distribution. That is, the renewal function, M(t), can be expressed as $$M(t) = \sum_{n=1}^{\infty} F_n(t)$$

where Fn(t) is the $n^{th}$ convolution of the interval cumulative distribution function. The computational problem arises because there is no closed-form expression for the renewal function arising out of probability distributions which do not have strictly proper rational Laplace transforms. One such distribution is the truncated normal distribution, a distribution commonly encountered in inventory management problems. The difficulty in evaluating the renewal function stems largely from the fact that the computation of convolutions for most probability distributions is quite time-consuming.

Researchers in the past have tried several approaches for computing the renewal function. H. Carlsson in "Remainder Term Estimates of the Renewal Function", published in *The Annals of Probability*, 11, 1, 1983, pp. 143–157, gives a comprehensive review of the approaches for computing the renewal function. Research in this area has adopted one of the two approaches for computing the value of the renewal function. One line of research has developed algorithms for explicitly computing the convolutions of the interval cumulative density functions and hence the renewal function. The second line of research has focused on computing the renewal function by inverting its Laplace-Stieltjes (LS) transform.

R. Cléroux and D. J. McConalogue in "A Numerical Algorithm for Recursively-Defined Convolution Integrals Involving Distribution Functions", published in *Management Science*, 22, 1976, pp. 1138–1146, and D. J. McConalogue in "Numerical Treatment of Convolution Integrals Involving Distributions with Densities having Singularities at the Origin", published in *Communications in Statistics, Series B* 10, 1981, pp. 265–280, developed a cubic-splining algorithm for computing the convolutions of the distribution function recursively. This algorithm was then used by L. A. Baxter, E. M. Scheuer, W. R. Blischke, and D. J. McConalogue in "Renewal Tables: Tables of Functions Arising in Renewal Theory", published as *Technical Report*, Graduate School of Business Administration, University of Southern California (1981) and L. A. Baxter, E. M. Scheuer, D. J. McConalogue, and W. R. Blischke in "On the Tabulation of the Renewal Function", *Technometrics*, 24, 1982, pp. 151–156, to tabulate the renewal function for five commonly used interval distributions. These results are now widely used as the benchmark by researchers in this area. However, this method is too computationally intensive for real-time computation of the renewal function. Therefore, in real applications, the renewal functions are computed by interpolating between values in lookup tables which have been generated a priori.

The LS transform is another attractive means of computing the renewal function. The key idea in this approach follows from the fact that the LS transform of the nth convolution of a distribution function is just the LS transform of the distribution function multiplied by itself n times. Therefore, the LS transform of the renewal function is a geometric series. The main problem with this method lies in inverting this resulting geometric series because, for most distributions, explicit inverses of the LS transforms are not available. Hence, one has to resort to numerical inversion of the LS transform, something that can require a considerable amount of computation.

The above-mentioned methods suffer from some serious drawbacks that make them unattractive for large-scale applications. In order to compute the value of the renewal function at some point other than the ones tabulated, one would typically have to rerun the algorithm or interpolate between tabulated values. In addition, the derivative and the integral of the renewal function cannot be computed easily. Therefore, we develop an approximant in which the renewal function of truncated normal distribution can be characterized by only two parameters: its coefficient of variation, and the point at which the renewal function needs to be evaluated. This approximant is based on the Padé approximant, as given by G. A. Baker in *Essentials of Padé Approximants*, Academic Press, of the renewal function given the coefficient of variation of the distribution. Padé approximants do not have the drawbacks present in the other methods of computing the renewal function and its related measures and provide a computable, differentiable, and accurate approximant.

W-B Gong, S. Nananukul and A. Yan in "Padé Approximation for Stochastic Discrete-Event Systems, *IEEE Transactions on Automatic Control*, 40, 8, 1995, pp. 1349–1358, developed Padé approximants for various performance measures of some stochastic discrete-event systems based on the Maclaurin expansion of the performance measures. Like Gong et al., we use the Maclaurin expansion as the basis for deriving the Padé approximants. However, Gong et al. have restricted their work to functions having strictly proper rational LS transforms. In fact, one can derive the closed-form expressions for the renewal function for distributions having strictly proper, rational, LS transforms. The focus of our work is on functions that lie outside the scope of the work of Gong et al. In particular, we develop Padé approximants for renewal functions arising out of truncated normal interval distribution.

Padé Approximants of the Renewal Function

We now outline a method for approximating the renewal function for the truncated normal probability distribution function, f(t). The approach provides a rational approximation for the renewal function using Padé approximants. Padé approximants are constructed from a power series expansion of the renewal function. The convergence properties of power series approximations depend in part on the convergence properties of the Maclaurin series expansion of the underlying interval distribution function. The theory of Padé approximants is developed based on the assumption that the Maclaurin series expansion of the distribution function is convergent for $t \geq 0$. However, the truncated normal distribution satisfies this assumption only for some finite radius of convergence, which will be called "a", and which is not easily determined. We present an approach which uses the Padé approximant coupled with the asymptotic behavior of the renewal function (which is derived independently) to compute the value of the renewal function for any t≧0. The sufficiency of such an approximation strategy for computing the renewal function is established by extensively comparing the results of our approximation with the renewal tables computed using a cubic splining algorithm (as described by D. J. McConalogue, supra). We now outline the theory of Padé approximants and then describe the switch-over strategy used to move from the Padé approximant to the asymptotic approximations.

Padé approximants for the renewal function are constructed in two steps: (i) generate the Maclaurin series expansion of the renewal functions, and (ii) derive a rational polynomial function using the coefficients of the Maclaurin series expansion. We present a brief description of this approach. This discussion is based on the text by G. A. Baker supra. The renewal function M(t) for any cumulative distribution F(t) is given as $$M(t) = \sum_{k=1}^{\infty} F_k(t) \quad (16)$$

Let $f_k^{(n)}$ denote the $n^{th}$ derivative of the k-fold convolution of the probability distribution function. The expression for $f_k^{(n)}$ is based on using a Maclaurin series expansion for the distribution functions and the definition of the convolution of two functions f(t), g(t)

$$f * g(t) = \int_0^t f(t-\tau)g(\tau)d\tau$$

Expanding the functions f(t), g(t) in terms of the

Maclaurin series $\sum_{i=0}^{\infty} \frac{f^{(i)}(0)}{i!} t^i$ and $\sum_{i=0}^{\infty} \frac{g^{(i)}(0)}{i!} t^i$ and integrating term by term yields the following expression:

$$f * g(t) = \sum_{n=0}^{\infty} \sum_{k=0}^{n} \frac{f^{(k)}(0)g^{(n-k)}(0)}{(n+1)!} t^{n+1} \quad (17)$$

The $n^{th}$ derivative of the convolution is $$(f * g)^n(0) = \sum_{i=0}^{n-1} f^{(i)}(0)g^{n-1-i}(0)$$

assuming (f*g)(0)=0. Now substituting g with f(k−1) in the above expression, we have $$f_k^{(n)}(0) = \sum_{i=0}^{n-1} f^{(i)}(0) f_{(k-1)}^{(n-i-1)}(0) \quad (18)$$

Notice that equation (18) calculates the $n^{th}$ derivative of the k-fold convolution using only n−1 derivatives $f^{(0)}$, $f^{(1)}$ (0), ..., $f^{(n-1)}$ (0) of the probability distribution function f(t).

Using equations (16) and (18) we can compute the coefficients of the Maclaurin series expansion of the renewal function.

Once we have computed the coefficients of the Maclaurin series expansions of the renewal function, we can proceed to construct a rational approximation. Consider a power series expansion of the renewal function $$M(t) = \sum_{j=1}^{\infty} c_j t^j.$$

The [L/M] Padé approximant to the renewal function M(t) is a rational function as shown below:

$$M(t) \approx \sum_{j=0}^{L+M} c_j t^j = \frac{P_L(t)}{Q_M(t)}$$

where $P_L(t)=a_0+a_1t+a_2t^2+ \ldots +a_L t^L$ and $Q_M(t)=b_0+b_1t+b_2t^2 + \ldots +b_M t^M$, which has a Maclaurin expression whose first L+M+1 coefficients agree with those of power series expansion. Expanding equation (19) and equating the coefficients of $t^0, t^1, \ldots, t^{L+M}$ we get $$\begin{bmatrix} b_M \\ b_{M-1} \\ \vdots \\ b_1 \end{bmatrix} = - \begin{bmatrix} c_{L-M+1} & c_{L-M+2} & c_{L-M+3} & \cdots & c_L \\ c_{L-M+2} & c_{L-M+3} & c_{L-M+4} & \cdots & c_{L+1} \\ \vdots & \vdots & \vdots & \vdots & \vdots \\ c_L & c_{L+1} & c_{L+2} & \cdots & c_{L+M-1} \end{bmatrix} \begin{bmatrix} c_{L+1} \\ c_{L+2} \\ \vdots \\ c_{L+M} \end{bmatrix} \quad (20)$$

The values of the coefficients $a_0, a_1, \ldots, a_L$ can now be evaluated using the estimates of $b_0, b_1, \ldots, b_M$ as follows:

$$a_0 = c_0, \quad (21)$$

$$a_1 = c_1 + b_1 c_0$$

$$\vdots$$

$$a_L = c_L + \sum_{i=1}^{\min(L,M)} b_i c_{L-i}$$

In this derivation, it has been assumed that the inverse used in equation (20) exists. By convention, $b_0$ is chosen to be unity with no loss of generality.

To complete the representation of the renewal function, we need to choose appropriate values of L and M. The choice of these parameters can in part be constrained by considering the behavior of the function as t→0 and t→∞. If the function goes to zero as t→∞, then L<M. If, however, the asymptotic behavior is linear, then L=M+1, or if it is quadratic, then L+M+2, and so on. Notice that if the renewal function goes to zero as t→0, then the leading constant in the numerator is zero; i.e., $a_0$=0. This follows from the Maclaurin series expansion.

The Truncated Normal Distribution

The approximations developed in the previous section depend on the convergence of the Maclaurin series expansion of the probability distribution function f(t). In this section we examine the convergence of the Maclaurin series expansion for the truncated normal distribution and its convolutions. Although the truncated normal (just like the normal) distribution does not possess a strictly proper rational Laplace transform (because of its $e^{at^2}$ form) we will show that the Maclaurin series still converges for any finite t.

The truncated normal distribution with its power series expansion is given as follows:

$$f(t) = \frac{1}{\sigma\sqrt{2\pi}\,(1-\Phi(0))}\exp\left(-\frac{(t-\mu)^2}{2\sigma^2}\right), t \geq 0 \qquad (22)$$

$$= \sum_{i=1}^{\infty} \frac{f^{(i)}(0)}{i!} t^i$$

where $\Phi(t)$ is the cumulative distribution function for a normal distribution with parameters $\mu$ and $\sigma$. The remainder term for this expansion is $$R_n(t) = \sum_{i=n+1}^{\infty} \frac{f^{(i)}(0)}{i!} t^i$$

which can be written as $$\int_0^t \frac{(t-x)^n}{n!} f^{(n+1)}(x)\,dx.$$

Using the Lagrange form for the remainder we can write it as $$R_n(t, 0) = f^{(n+1)}(c)\frac{t^{(n+1)}}{(n+1)!} \qquad (23)$$

where $0 \leq c \leq t$. Let us now examine the remainder $R_n$ as $n \to \infty$. Clearly, the term $$\frac{t^{n+1}}{(n+1)!} \to 0$$

as $n \to \infty$, $\forall t$. Now all that remains to be done is to show that the derivative term is bounded. The derivative term can be written as follows $$f^{(n+1)}(t) = f(t)\psi_{n+1}(t)$$

where $\psi_{n+1}(t)$ is a polynomial of order n+1. Since f(t) is the pdf of the truncated normal distribution, we know that it is bounded for all t. Moreover, for $t \in [0, t_r]$ we can always find bounds m,M such that the polynomial $\psi_{n+1}(t)$ is bounded as $m \leq f_{(n+1)}(t) \leq M$. Therefore, within some radius of convergence $t_r$ the remainder term will go to zero as $n \to \infty$.

We also need to show that the remainder term in the Maclaurin expansion of each convolution converges to 0 as $n \to \infty$. This requires the following two steps. The remainder term in the Maclaurin expansion of each convolution can be expressed in its Lagrangian form, similar to equation (23). In order to show that this remainder term converges to 0 as $n \to \infty$, it is necessary to show that the derivatives of each convolution are bounded. This follows from equation (18). Although it has been shown that the Maclaurin expansion for the truncated normal distribution and its convolutions converge within a finite radius of convergence, it is still not sufficient to show that the Maclaurin expansion of the renewal function of the truncated normal distribution will converge. It is expected that the Maclaurin expansion will converge within some radius of convergence which cannot be determined readily. One would expect the approximations to degrade beyond this boundary.

Approximations for the Truncated Normal Renewal Function

The approach according to the invention for approximating the truncated normal renewal function is motivated by a pragmatic need for a computable approximation which is valid over the entire range of operation. The Padé approximation is used for estimating the renewal function close to the origin, and a switch over to an asymptotic approximation is used at a later stage. From a practical point of view, one now needs to determine the switch-over point at which the asymptotic estimate of the renewal function is reasonably accurate. The methodology for determining this switch-over point implemented by this invention is similar to that of I. Sahin as described in *Regenerative Inventory Systems: operating Characteristics and Optimization*, Springer-Verlag, New York (1990). A third-order switch-over polynomial has been developed in terms of the coefficient of variation of the interval distribution. Overall, the approximations of the invention are very accurate, usually within 1% of the optimal values. The use of a switch-over from the Padé approximant to the asymptotic value also results in considerable computational savings. The switch-over polynomial is used to determine if the Padé approximant needs to be computed. In this section, the rule used for switching over from the Padé approximant to its asymptotic approximation is outlined.

H. Carlsson in "Remainder Term Estimates of the Renewal Function", *The Annals of Probability*, 11, 1, 1983, pp. 143–157, studied the convergence of the renewal function to its asymptote. Carlsson derived some higher order asymptotes to the renewal function under some special conditions. If the distribution has a finite mean and a finite variance, the linear asymptotic approximation for the renewal function is given as:

$$M(t) = \frac{t}{\mu} + \frac{\sigma^2 - \mu^2}{2\mu^2}, t \to \infty \qquad (24)$$

where $\mu$ and $\sigma$ are the mean and standard deviation of the truncated normal distribution. If in addition, the distribution also has finite third or higher-order moments, Carlsson showed that $$M(t) = \frac{t}{\mu} + \frac{\sigma^2 - \mu^2}{2\mu^2} + \frac{S(t)}{\mu^2} + \frac{\sigma^2 + \mu^2}{\mu^3} R(t) + o(t^{-m}\log t), \qquad (25)$$

$$t \to \infty \text{ where } R(t) = \int_t^{\infty} (1 - F(y))\,dy,$$

$$S(t) = -\int_t^{\infty} R(y)\,dy, \text{ for } t \geq 0,$$

and m is the maximum finite higher-order moment of the distribution. Therefore, the renewal function converges fairly rapidly to its asymptote.

Following the discussion in I. Sahin, supra, $$J(t) = \frac{\left|M(t) - \left[\frac{t}{\mu} + \frac{\sigma^2 - \mu}{2\mu^2}\right]\right|}{M(t)}$$

is defined as the relative error of the linear asymptotic approximation. In order to determine the value of switchover point $t = \rho\mu$ for a given relative error level $\epsilon$, $$\rho(\epsilon) = \infty\{\rho : J(\rho\mu) = \epsilon, J(t \leq \epsilon, t \leq \rho\mu\}$$

is defined, where $\epsilon > 0$. Now large enough t corresponds to $t \leq \rho(\epsilon)\mu$. Sahin, supra, has developed a second-order polynomial approximation for $\rho(\epsilon)$ in terms of the coefficient of variation $cv = \sigma/\mu$ of the interval distribution. This invention implements a third-order polynomial in terms of the coefficient of variation of the interval distribution. In order to determine the third-order switch-over polynomial, the switch-over point was first computed for many values of the coefficient of variation of the distribution. The third-order switch-over polynomial was derived through a regression over the switch-over points computed for each coefficient of variation. The results of the renewal approximation using this third-order switch-over polynomial are more accurate than those using Sahin's polynomial function.

Generating the Renewal Function Surface

In this section, there is presented a description of the methodology for reducing the evaluation of the renewal function to just two input parameters: the coefficient of variation and the point at which the renewal function needs to be evaluated. As a result, there is obtained a surface over which one can evaluate the renewal function for a range of coefficients of variation and the points at which the renewal function needs to be evaluated.

In order to generate this surface, we first develop the Padé approximants for a large number of coefficients of variations. For each coefficient of the resulting set of rational polynomials, a polynomial function is fit in terms of the coefficient of variation of the distribution using regression.

Therefore, for the renewal function of the truncated normal distribution the entire surface can be represented as follows. For points that lie in the asymptotic range, the surface is given by the asymptotic properties of the renewal function. The boundary between the asymptotic range and the non-asymptotic range is delineated by the third order switch-over polynomial described earlier. In the non-asymptotic range, the surface for renewal function is represented by the ten polynomial functions, each corresponding to a coefficient of the rational approximant. These polynomial functions are in terms of the coefficients of variation of the distribution.

Results

In order to develop an accurate estimator for the renewal function, several classes of Padé approximants were tested including [L+1/L], [L+2/L], and [L+3/L]. It was found that no class of approximants was good enough to approximate the renewal function accurately over the entire range from 0 through ∞, and over a wide range of coefficient of variation values. This probably stems from the fact that the Maclaurin expansion of the renewal function for truncated normal does not converge over $R^+$. Therefore, the strategy of approximating the renewal function with the Padé approximant near the origin and switching over to the asymptotic approximation farther out from the origin was employed. Since the renewal function grows at a linear rate at its asymptote, one would be tempted to only consider [L+1/L] class of approximants. However, since the Padé approximant is used only close to the origin, it is possible to consider [L+2/L] and [L+3/L] classes without sacrificing asymptotic accuracy.

It was found that the [L+2/L] class of Padé approximants gave a very good estimate of the renewal function close to the origin with L=4 for a wide range of values of the coefficient of variation. Note that [6/4] Padé approximants require solving a system of linear equations having four unknowns.

The Padé approximant computes the renewal function very accurately for most values of $\mu/\sigma$. However, the error between the values from the Padé approximant and Baxter et al., supra, is high near the origin for higher values of $\mu/\sigma$.

Note that the renewal function is decreasing in ratio of $\mu/\sigma$ of the distribution. Therefore, at high values of $\mu/\sigma$, the value of the renewal function will be very small near the origin. Since Baxter et al. have tabulated the renewal function only up to four digits after the decimal point, for high $\mu/\sigma$ ratios, their tables lose precision because of fewer significant digits near the origin. Hence the error between the Padé approximants and the values of Baxter et al. near the origin for higher values of $\mu/\sigma$ are because of the loss of precision in the values from the Baxter et al. tables.

The third-order polynomial function used to determine the switch-over point from the Padé approximant to the linear asymptotic value can be expressed as:

$$\hat{\rho}(0.01) = -2.9931 + 40.4917cv - 83.9918cv^2 + 52.4062cv^3. \quad (27)$$

The second-order, switch-over polynomial due to Sahin is:

$$\hat{\rho}(0.01) = 4.236 - 9.011cv + 6.523cv^2. \quad (28)$$

CONCLUSION

This invention provides a method for fast and accurate evaluation of the performance characteristics of one of the most commonly used inventory policies, the periodic-review (s,S) policy with complete back ordering. This policy has an underlying stochastic process that is a renewal process; therefore, all the performance characteristics can be expressed in terms of the renewal function. Although these expressions in terms of the renewal function are analytically exact, it has been very difficult to evaluate them numerically because there is no closed-form expression for the renewal function for most probability distributions. Therefore, in practice one uses asymptotic renewal theory in estimating the performance characteristics.

Rational polynomial approximants (also called Padé approximants) to the renewal function have been developed. These approximants are very accurate, easy to compute, and are reusable. In particular, the strategy employed is that of approximating the renewal function with the Padé approximant close to origin and using the asymptotic results farther from the origin. A polynomial function has also been developed in terms of the coefficient of variation of the interval distribution to determine a priori if the asymptotic results would be applicable, obviating the need to compute the Padé approximant in many instances. Overall, the results of the approximations implemented in the practice of the invention are within 1% of the optimal values for most coefficients of variation of the distribution.

The Padé approximants used in this application of the invention rely on the Maclaurin series expansion of renewal function. The method will work for distributions which do not have singularities at the origin.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method to derive fast and accurate performance measures of a periodic-review (s,S)-type inventory policy for large scale inventory systems, where s is a reorder point and S is an upper ordering limit comprising the steps of:

inputting a plurality of inventory variables comprising mean demand/period, standard deviation of demand/period, lead time, review period length, holding cost/unit/period, shortage penalty/unit/period, ordering unit, fill rate, average cost/period, expected on-hand inventory, expected back order level, and safety stock level;

computing an initial solution for (s,S) from said plurality of inventory variables and, using this initial solution for (s,S), entering a stochastic renewal processing loop in which an optimal (s,S) solution is computed; and when the optimal (s,S) solution is found, outputting the optimal (s,S) solution for controlling said inventory system where s controls when an order is placed and S controls an amount of inventory to be ordered.

2. The computer implemented method as recited in claim 1 wherein the stochastic renewal processing loop includes the steps of:

computing performance measures using an approximation of a renewal function in which a truncated normal distribution is characterized by its coefficient of variation and a point at which the renewal function needs to be evaluated;

computing partial derivatives of the computed performance measures;

testing to determine if an optimal (s,S) solution has been computed based on the computed partial derivatives;

if an optimal (s,S) solution has not been computed, computing a step length and search direction, generating a new (s,S) solution, and then repeating the steps of computing performance measures and computing partial derivatives until an optimal (s,S) solution is found.

3. The computer implemented method as recited in claim 2 wherein the approximation of the renewal function is computed comprising the steps of:

developing a class of rational polynomial approximations for the renewal function; and deriving polynomial expressions for each coefficient of approximants in terms of a coefficient of variation of distribution.

* * * * *